United States Patent

Clay et al.

[15] 3,653,473
[45] Apr. 4, 1972

[54] VEHICLE BRAKE CONSTRUCTIONS

[72] Inventors: Benjamin Andrew Clay; Glyn Phillip Reginald Farr, both of Kings Rd., Tyseley, Birmingham, 11, England

[73] Assignee: Girling Limited

[22] Filed: Nov. 3, 1969

[21] Appl. No.: 873,316

[30] Foreign Application Priority Data

Nov. 14, 1968  Great Britain.....................54,114/68
Feb. 6, 1969   Great Britain........................6,456/69

[52] U.S. Cl............................188/353, 188/106 P, 188/265
[51] Int. Cl.........................................................F16d 65/26
[58] Field of Search...............188/78.22, 78.5, 106 A, 106 P, 188/152.3, 152.15, 265, 79.56 T, 196; 303/89

[56] References Cited

UNITED STATES PATENTS

| | | | |
|---|---|---|---|
| 2,161,641 | 6/1939 | Schnell | 188/106 A X |
| 2,230,411 | 2/1941 | Parnell et al. | 188/106 P X |
| 2,619,203 | 11/1952 | Shaw | 188/106 P X |
| 3,487,894 | 1/1970 | Szigeti | 188/106 P X |
| 3,513,946 | 5/1970 | Rick | 188/353 |
| 3,472,124 | 10/1969 | Roselius et al. | 92/24 X |

*Primary Examiner*—Duane A. Reger
*Attorney*—Scrivener, Parker, Scrivener and Clarke

[57] ABSTRACT

In a drum or disc brake having a locking means for holding the friction elements applied mechanically for parking etc., the locking means is operatively connected to a friction element independently of the normal actuation means. The locking means preferably comprises an extensible strut normally free to extend and contract to follow up friction element movements. A clutch is operative to lock the strut in extended condition to apply the lock and is releasable by means of a pressure operated clutch release motor having a piston directly engageable with one of the strut members. To release the lock the piston displaces the said strut member to disengage the friction clutch, whereafter the strut can contract to release the brake. These arrangements therefore cut out lost motion which takes place if (a) the lock acts on a brake actuating linkage instead of on a friction element; or (b) if the clutch release motor acts on the clutch mechanism instead of on the strut itself.

10 Claims, 4 Drawing Figures

Patented April 4, 1972

INVENTOR

BY

ATTORNEY

VEHICLE BRAKE CONSTRUCTIONS

This invention relates to vehicle wheel brake constructions, including automatic locking means effective to hold the brake shoes or other friction members in braking engagement with a drum or other brake rotor.

Such locking means are known, but have hitherto been incorporated in a power actuator, in turn connected to the wheel brakes through mechanical linkages with consequential disadvantages of loss of efficiency through friction and lost motion.

It is an object of the invention to provide a vehicle wheel brake avoiding or minimizing these disadvantages. The invention accordingly provides in a vehicle wheel brake, a brake rotor, a fixed structure, a friction element movably mounted on the fixed structure for movement into and out of engagement with said brake rotor, a power operated service brake actuator for applying said friction element to said rotor, selectively operable locking means for holding said friction element applied to said rotor, means operatively connecting said locking means to said friction element independently of said actuator, said locking means having a first operative condition in which it automatically follows up movements of said friction element towards and away from said brake rotor and a second operative condition in which it locks said element against movement away from said rotor, and a driver operated control for selecting the first and second operative conditions of said locking means.

With such an arrangement, the locking means may be built into the wheel brake structure, thereby simplifying installation in a vehicle, and mechanical losses may be minimized.

The locking means may act between the fixed structure and the friction element, or in the case of a drum brake having two opposed friction elements in the form of brake shoes, may act between the two shoes.

The locking means preferably take the form of an extensible strut assembly, which in its first operative condition is free to extend to follow up actuating movements of the friction element, and in its second operative condition is locked against retraction, so as to provide a solid abutment for the friction element, locking it in engagement with the rotor. The lock is released by returning it to the first operative condition, in which the strut is retracted by the action of shoe return springs or equivalent means acting on the friction element.

The locking means preferably includes a friction clutch which is disengageable by the application of fluid pressure to a motor incorporated in the unit. This disengaged condition of the clutch corresponds with the first operative position of the locking means.

In the particular embodiments described below, the strut includes co-operating screw-threaded members, the above mentioned clutch serving to lock them against, or free them for relative rotation.

A further object of the invention is the provision of a vehicle wheel brake having locking means including an extensible strut assembly for holding a friction element in applied condition when the strut is locked in extended position by a clutch, and a pressure actuated clutch release motor having a piston engaging directly against a member of the strut, thus ensuring positive displacement of the strut member in a sense to permit disengagement of the clutch.

Some internal drum wheel brake constructions incorporating locking means, in accordance with the invention, will now be described, by way of example only, with reference to the accompanying drawings, in which.

Figure 1:
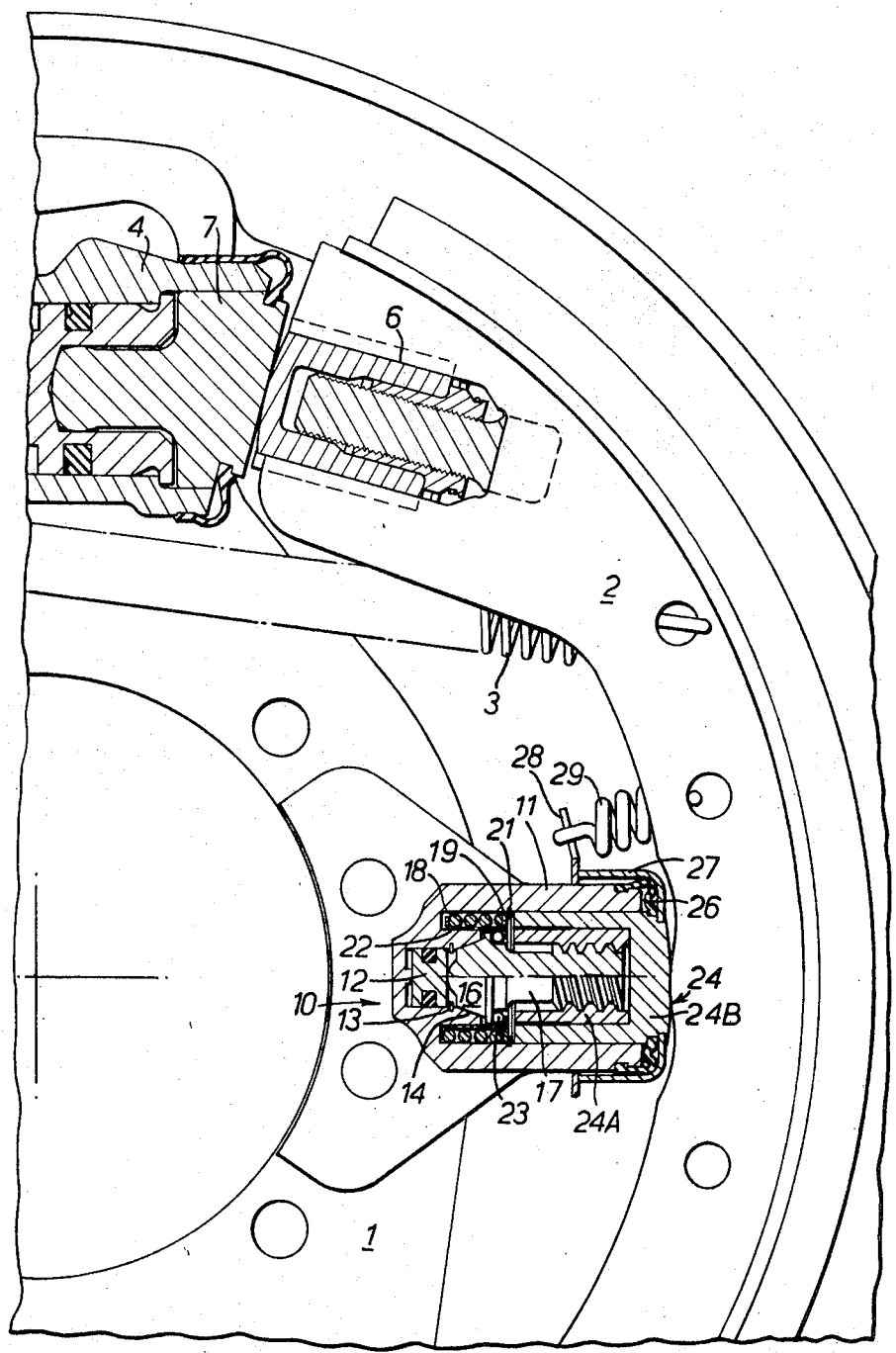
FIG. 1 is a part sectional elevation of a quadrant of one wheel brake construction.

The brake shown in FIG. 1 comprises a fixed back plate structure 1, on which are movably mounted opposed brake shoes 2 (only one of which is seen in FIG. 1) interconnected by shoe return springs 3, and a double ended hydraulic slave cylinder 4 (constituting a service brake actuator) between each pair of adjacent shoe ends of the respective shoes. Each shoe has one end directly engaged by one piston of the adjacent slave cylinder, and the other end is provided with an automatically adjustable abutment 6 and thrust block 7 engaging the adjacent piston of the other slave cylinder. This actuation arrangement provides a two leading shoe effect for forward and reverse rotation.

Positioned at the mid-point of each shoe is a mechanical locking means or brake lock unit 10, one of which is shown in detail in FIG. 1. Each unit 10 comprises a cup-shaped housing 11 bolted to the back plate 1 and closed at its inner end by a transverse end wall. The bore of the housing has at its radially inner end a reduced portion constituting a cylinder for a piston 12, a pressure fluid inlet (not shown) being provided at the inner end of the cylinder. Outward movement of the piston is limited by a circlip 13. Adjacent the outer end of the cylinder is a frusto-conical clutch surface 14 which co-operates with a complementarily shaped head 16 on a center spindle 17. The head 16 is biased into frictional clutching engagement with the surface 14 by a compression spring 18 acting at one end in washer 19 supported by a circlip 21, and at its other end on a flange of a sleeve 22, the outer end of which has an internal flange engaging the head 16 through a ball thrust race 23.

The outer portion of the spindle is formed with a reversible screw-thread engaging in a two-part nut 24, of which the inner part 24A is press-fitted into a cup-shaped outer part 24B which makes a sliding fit in the outer part of the bore of housing 11. The outer part 24B carries a flexible sealing boot 26 to protect the surface of the housing bore, and a castellated cap 27, rotation of which relative to the back plate is normally prevented by a bolt, not shown. A pressure plate 28 acting on the cap 27 is engaged by a pair of tension springs 29 anchored to the web of the adjacent shoe 2.

The lock unit 10 is shown in its fully retracted position, with the cylinder of piston 12 at tank pressure. In this condition, the spring 18 holds the friction clutch 14, 16 engaged to prevent rotation of the spindle relative to the housing 11 and nut 24.

During normal vehicle operation, fluid under pressure passes through a normally open control valve, having an operating lever under the control of the driver, to the cylinder space, forcing the piston 12 outwardly against a domed end of the spindle 17. When the service brake is actuated, the shoes are moved apart into braking engagement with the drum, enabling the spindle 17 and nut 24 to move outwardly under the action of the springs 29, releasing the clutch torque and enabling the spindle to spin on its thrust bearing in response to the resultant axial movement of the nut 24 relative to the spindle. The relative rotation between these parts effectively lengthens the extensible strut assembly which they constitute and enables the nut to follow up automatically the movement of the shoe 2.

During normal temporary brake application, these movements are reversed on release of the service brake pressure, but for parking purposes, the driver holds the service brake applied while moving his valve control lever to the closed position. This releases the pressure behind piston 12, allowing the friction clutch to re-engage under the action of the spring 18. Service brake pressure is then released, but the shoe 2 is held in braking engagement with the drum by the lock unit, the spindle of which is frictionally clutched against reverse rotation under the action of the shoe return springs.

The parking brake is released by re-opening the control valve to pressurize the cylinder and displace the piston 12 outwardly, thereby releasing the friction clutch once more.

During very heavy braking, it is possible for the drum to become overheated and therefore expanded. If the parking lock is applied under these circumstances, the axial loads imposed by cooling of the drum may be so high that the available hydraulic pressure is insufficient to release the lock through the small piston and cylinder motor. In this case, the brake may be freed by releasing the bolt which normally locks the cap 27. The strain energy stored in the drum and shoe return springs should then be sufficient to cause the cap to rotate through a small angle to unload the spindle, whereupon retraction takes place as before. If necessary, initial rotation of the cap can be effected by engaging a screw driver or other tool in the castellations. When the lock is fully retracted the cap is again locked against rotation by re-securing the bolt.

Figure 2:
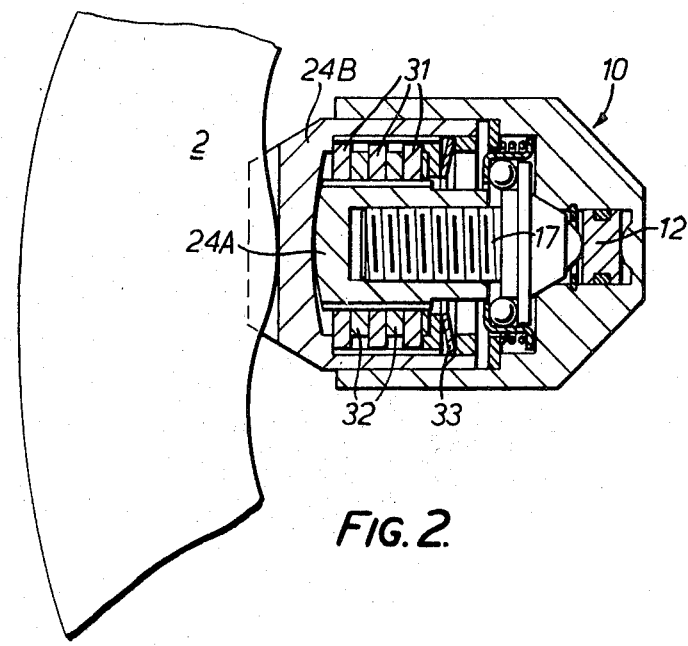
FIG. 2 is a sectional elevation of a modified form of locking means.

An alternative approach to the problem of releasing the brake after overheating of the drum is exemplified in the modified construction of FIG. 2. The basic arrangement of the housing, spindle and piston are the same as in FIG. 1, but the inner nut part 24A and outer nut part 24B are coupled together by a friction clutch arrangement of a predetermined maximum torque capacity. The outer part 24B is keyed against rotation by its engagement with the adjacent shoe web, and has a splined bore in which are slidably keyed a number, in this case three, of spacer rings 31, which are interleaved with two friction rings 32 splined on to the inner nut part 24A. A coned spring washer 33, such as a belleville washer, applies a predetermined axial load to the pack of friction rings and spacers, and hence a predetermined torque coupling between the nut parts. If the axial load on the lock exceeds the normal operating value, say 4,000 lbs, the clutch just described slips, permitting the inner nut part to rotate on the spindle and the excess load is thereby relieved.

In the above described embodiment and modification, the lock units 10 are connected to the mid-points of the shoes and while some advantages are to be had by such an arrangement, it is advantageous in other respects for the lock units to act nearer the directly actuated end of each shoe, where the shoe movements are greatest.

Figure 4:
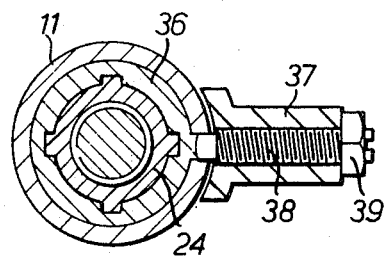
FIG. 4 is a section on the line IV—IV of FIG. 3.
Figure 3:
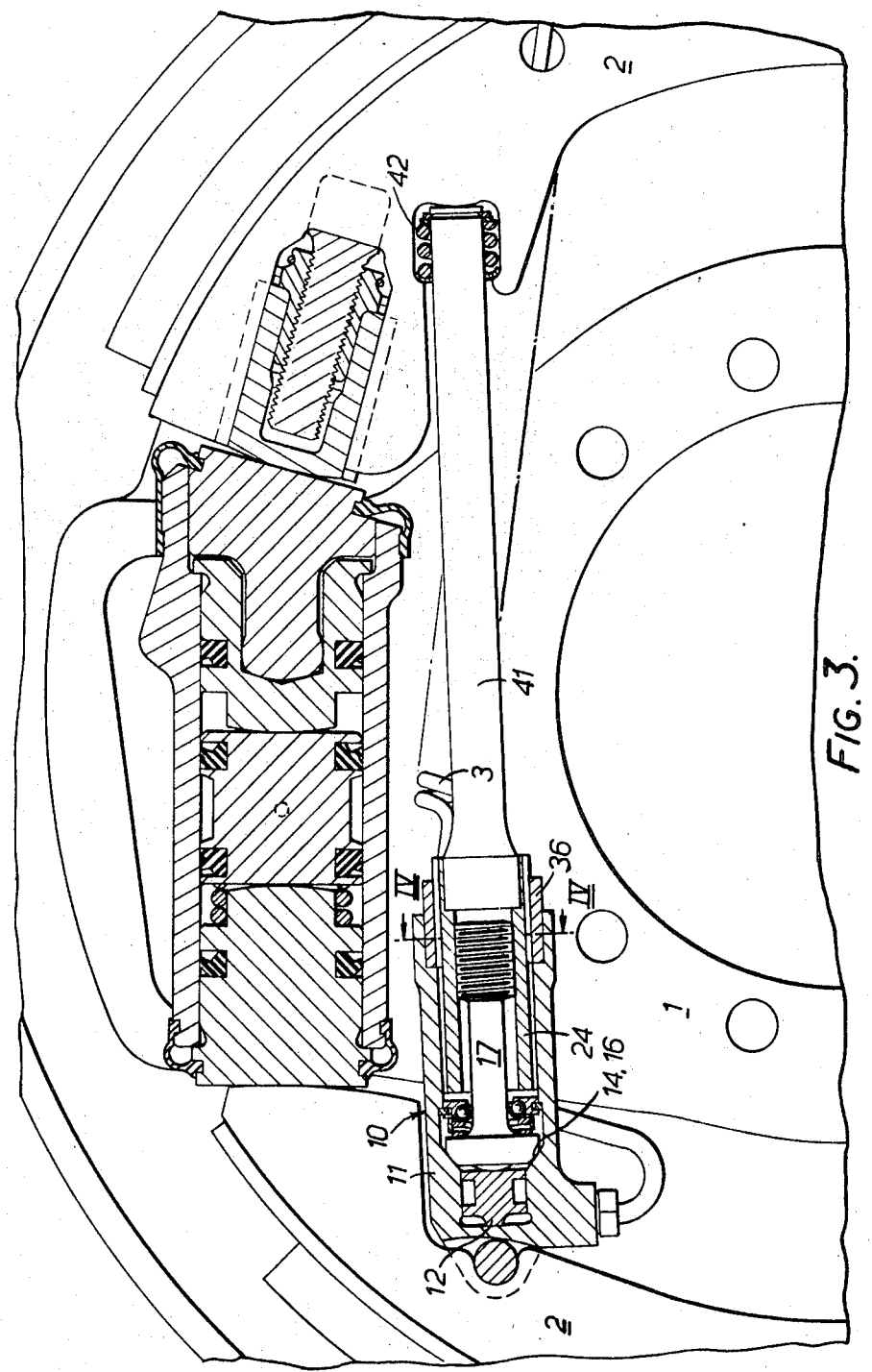
FIG. 3 is a side elevation of part of a second wheel brake construction.

Such an arrangement is shown in FIGS. 3 and 4, which show a brake construction in which the lock units are incorporated in respective struts acting between the two shoes.

Only the upper strut and lock unit are shown in FIGS. 3 and 4, the lower being identical in construction and operation but reversed left to right as viewed in FIG. 3.

The construction of the lock unit is basically the same as those described above, and corresponding parts have the same reference numerals as in FIG. 1. The housing 11 is pivotally but non-rotatably connected to the adjacent shoe web and houses within its bore a piston 12, spring loaded clutch 14, 16 and a tubular nut 24 having an axially splined external surface which receives an internally splined collar 36 partially received in the open end of the housing 11. The collar has a generally radially extending arm 37 which is cranked back over the open end of the housing and extends through a slot provided in the brake back plate. This arm has threaded into it a locking pin 38 whose inner end normally engages in a hole in the housing, in which position it is secured by a lock nut 39 and locks the collar 36 to the housing 11. Secured to the outer end of the nut 24 is a rod 41 which, at its remote end abuts the opposite shoe web in a manner permitting articulation between the rod and the shoe. A small coil spring 42 acts as an anti-vibration spring.

Normal operation of the lock corresponds with that of the lock of FIG. 1. If the lock jams due to overheating and subsequent contraction of the drum, the pin 38 is unscrewed to disengage the collar from the housing, thereby releasing the nut 24 for rotation to unload the spindle.

With each of the above-described arrangements, the driver's control may be a simple valve arrangement as described above, controlling only the supply of pressure to the lock unit. Alternatively, however, it could be arranged as a comprehensive parking brake control for controlling not only the lock unit but also an auxiliary supply, say from an accumulator, for the wheel slave cylinders. For example the control sequence, with the service brake pressure off, may be: 1. Lock pressurized, slave cylinders unpressurized; 2. Slave cylinders pressurized from accumulators; 3. Lock pressure released to operate lock; 4. Slave cylinders unpressurized. This control sequence would conveniently be predetermined by a gate through which the drivers control lever is moved.

In these embodiments, the lock unit will be seen to have essentially two operative conditions, a first operative condition, when the friction clutch is disengaged, in which the lock unit automatically follows up movement of brake shoe or shoes, and a second operative condition, when the friction clutch is engaged with the shoes applied, in which the lock unit is locked against retraction and thereby holds the shoe or shoes applied, independently of the service brake actuator, which can then be relieved of pressure for long term parking. It would also be possible for the lock unit to have a third, inoperative condition, in which it is normally held retracted, until released to follow up shoe movements when a parking operation is required.

In all of the lock units described and illustrated herein, it will be noted that the overall thickness or diameter of the lock units is such as to render possible its incorporation in a drum brake at a spacing from the back plate corresponding to that of the shoe webs from the back plate. This compact structure is made possible by the use of a relatively small piston 12 aligned with and acting upon the spindle, or screw part 17 at the common center line of the parts 12 and 17. Since the piston acts directly on the part 17, so that there is no lost motion due to linkage tolerances, a small displacement of the piston is sufficient to break the clutching engagement and free the part 17 for rotation. This in turn enables the axial length of the lock unit to be kept within reasonable limits.

Although the invention has been particularly described in relation to internal shoe drum brakes, it will be readily understood by those skilled in the art that it will be applicable also to other forms of vehicle brakes, such as disc brakes.

We claim:

1. In a vehicle wheel brake, a brake rotor, a fixed structure, a friction element movably mounted on the fixed structure for movement into and out of engagement with said brake rotor, a power operated service brake actuator for applying said friction element to said rotor, selectively operable locking means for holding said friction element applied to said rotor, means operatively connecting said locking means to said friction element independently of said actuator, said locking means comprising an extensible strut having a first part connected to said fixed structure and a second part connected to said friction element, a releasable lock cooperating with said strut and being constructed and arranged to have a first released condition wherein the strut freely extends and contracts to follow up automatically movements of said friction element towards and away from said brake rotor and a second locked condition in which it locks said strut against contraction to retain said element against movement away from said rotor, and a driver operated control for selecting the first and second condition of said lock.

2. A vehicle wheel brake according to claim 1, wherein said fixed structure is a brake back plate, said friction element is one of a pair of internal, arcuate brake shoes and said brake rotor is a brake drum.

3. A brake according to claim 2, wherein said locking means acts directly between said back plate and one of said brake shoes.

4. A brake according to claim 3, wherein a second locking means acts directly between said back plate and the other said brake shoe.

5. A brake according to claim 2, wherein said locking means acts directly between said two brake shoes.

6. A brake according to claim 1, wherein said locking means further includes a friction clutch which, in its engaged condition locks said strut against contraction, and a fluid pressure motor for controlling engagement and disengagement of said clutch.

7. A brake according to claim 6, wherein the strut assembly includes relatively rotatable screw and nut parts having a reversible screw-threaded interconnection, one of the said parts being held against rotation, and the other being rotatable when said clutch is disengaged.

8. A brake according to claim 7, including a housing member, means resiliently biasing one of said screw and nut parts into frictional clutching engagement with said housing member, a cylinder and piston carried by said housing member, means operatively connecting said piston to said part which is resiliently biassed into frictional clutching engagement with said housing member, and means for applying fluid pressure to said cylinder to effect axial displacement by said piston of the frictionally engaged part to release the same for rotation.

9. A brake according to claim 1, wherein said mechanical locking means comprises a cup-shaped housing having a transverse end wall and secured against rotation in the brake, a nut part mounted within the housing for axial movement therein but keyed against rotation relative thereto, a screw part extending through said nut part and having a reversible screw-threaded interconnection therewith, spring means urging the screw part axially into frictional clutching engagement with said end wall of said housing, an open-ended cylinder formed in said end wall and a piston in said cylinder co-axially aligned with said screw part and engageable therewith on the common center line of said piston and said housing, said piston being operable, upon the application of fluid pressure to said cylinder, to displace said screw part axially sufficient to break the clutching engagement between said housing and said screw part to permit rotation of said screw part relative to said housing and said nut part.

10. A vehicle wheel brake comprising: a brake rotor; a fixed structure; a friction element movably mounted on said fixed structure for movement into and out of braking engagement with said brake rotor; a power operated service brake actuator for applying said friction element; locking means acting on said friction element independently of said actuator and including an extensible strut assembly having a first part connected to said fixed structure and a second part connected to said friction element, said strut being constructed and arranged to have a first operative condition in which it automatically follows up movements of said friction element and a second operative condition in which it locks said element against movement away from said brake rotor; clutch means engageable to lock said strut assembly in an extended condition and thereby select the second operative condition; and a clutch operating motor comprising a cylinder and a piston, said piston being directly engageable with said strut assembly for effecting disengagement of said clutch when said cylinder is pressurized, to select said first operative condition of said strut assembly.

* * * * *